Feb. 14, 1933.  H. E. BIRKHOLZ  1,897,976
FILTRATION MEDIUM
Original Filed Nov. 25, 1927
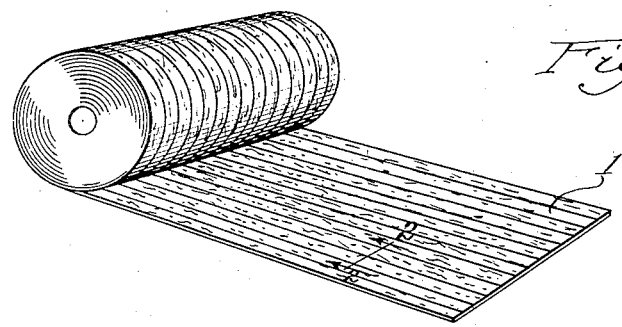
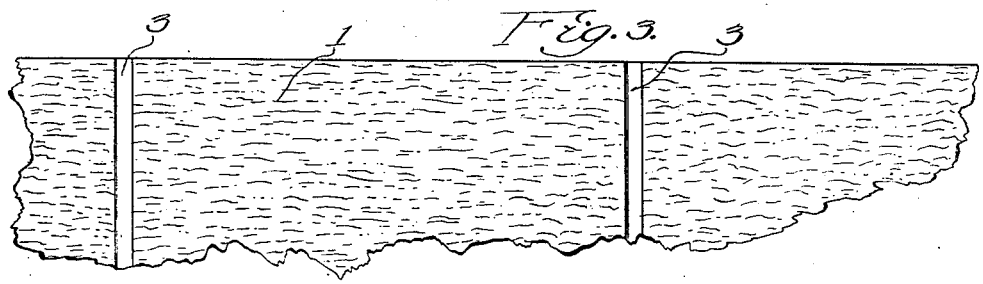
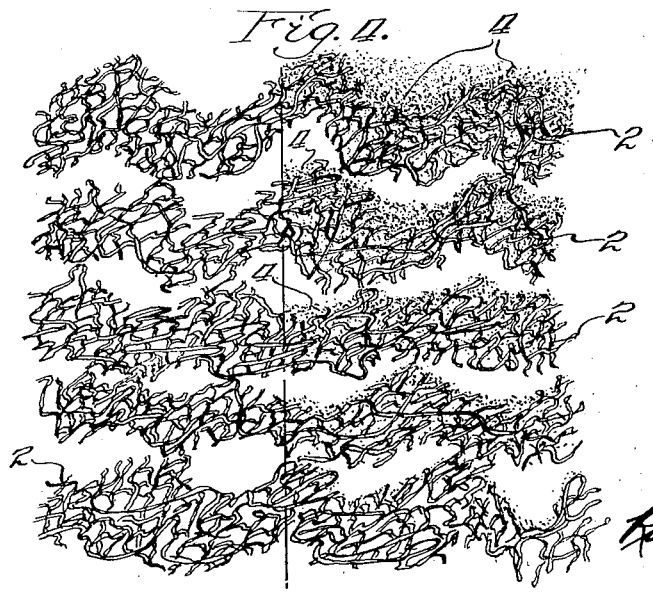
Inventor
Hans E. Birkholz.
Rummler Rummler
Attys.

Patented Feb. 14, 1933

1,897,976

UNITED STATES PATENT OFFICE

HANS E. BIRKHOLZ, OF LOUISVILLE, KENTUCKY, ASSIGNOR, BY MESNE ASSIGNMENTS, TO AMERICAN AIR FILTER COMPANY, INC., OF LOUISVILLE, KENTUCKY, A CORPORATION OF DELAWARE

FILTRATION MEDIUM

Application filed November 25, 1927, Serial No. 235,509. Renewed February 21, 1931.

This invention relates to an air and gas filtration medium of a type which, after being used for a period of time, is discarded and not re-used.

The main objects of this invention are to provide an improved form of air and gas filtration medium; to provide a filtration medium that is of comparatively low cost; to provide a filtration medium which has a large capacity for storing the dirt and dust filtered from air and gas; to provide a filtration medium which utilizes true filtering principles for eliminating dirt and dust from the air, and to provide a filtration medium which is highly efficient and particularly adaptable for filtering dust and lint-laden air from factories and the like.

An illustrative embodiment of this invention is shown in the accompanying drawing in which:

Figure 1 is a view in perspective of a roll of the improved filtering material, with a portion thereof unrolled.

Fig. 2 is an enlarged fragmentary thin section taken on the line 2—2 of Fig. 1.

Fig. 3 is an enlarged fragmentary plan view of the material.

Fig. 4 is a highly magnified fragmentary thin section of the material, the left half of the figure showing the material in its clean state, the right half of the figure showing it laden with dust and dirt.

In the filtration of dry air and gas the true filtering principle was at first utilized in the industry by using cloth, fine wire mesh and the like. It was soon apparent, however, that such materials quickly became clogged up with dirt and dust, thus presenting sufficient resistance to the passage of air as to render them unfit for use. A weakness of this method was that it was impractical to thoroughly clean or recondition such material for re-use because much of the dust becomes permanently lodged in the weave or mesh.

The industry in general then turned and adopted the baffle form principle, using semi-dry or viscous filter material, in which the separation of the dirt and dust from the air depended upon the air currents striking the baffle surface and being sharply deflected in their course, the particles of dust and dirt passing on and adhering to the viscous surface of the baffle walls. An advantage of such filters is that they can be readily washed clean, particularly where they are made of the continuous automatic type. Such filters, however, are relatively expensive to build and usually require considerable expense for upkeep and maintenance. Another objection is the difficulty of adapting the necessary viscous liquid coating to meet varying seasonable temperature changes.

The present invention is a reversion to the original true filtering principle. The material used, however, is sufficiently cheap and inexpensive, so that after being used to the point where the interstices are so filled with dirt as to present an undesirable resistance to the passage of air, it is discarded or thrown away and not re-used.

For this purpose, a material made of paper pulp or other fibrous material has been utilized. The material itself is loosely fabricated in limp, flimsy, gossamer-like sheets of transparent veil-like character. Otherwise stated the sheets may be said to be composed of delicate threads of fibres matted or otherwise formed into a net work so thin and flimsy that it is transparent or semi-transparent. A plurality of these sheets are incorporated into a unitary structure so as to provide storage space for a quantity of dirt and dust and also to impart strength to the material. The texture of the sheets may be progressively denser, the most loosely fabricated sheets being on the side through which the air first enters, and the most densely fabricated layer on the opposite side.

In the construction shown in the drawing, the filter material 1 is made in the form of a web of indefinite length, the width being preferably twenty-four inches so as to be easily handled.

The web 1 of filter material is formed from a plurality of flimsy, porous, foraminous, gossamer-like sheets 2, the individual sheets being profusely crinkled, somewhat like crape paper, so as to lie loosely together to form a fluffy mass. The crinkling of the individual sheets also forms dirt and dust pockets for storing impurities filtered from the air and each layer itself is so loosely fabricated that dirt and dust lodges and accumulates among the fibres, forming the individual sheets, as shown particularly in Fig. 4. The density of texture of the sheets 2 may be varied in accordance with different conditions to be met.

The individual sheets 2 are so flimsy in construction that they can only be handled with great difficulty without tearing or rupturing. Therefore, in order to impart strength to the web, and at the same time bind them into a unitary structure, a plurality of the individual sheets is compressed tightly together as shown at 3 along relatively narrow longitudinally disposed areas by an embossing roller so as to unite the layers.

As shown in Fig. 4, the crinkling of the sheets forms pockets for the storing of dirt and dust 4. Each of the sheets 2 would not be by itself an efficient air filter due to its foraminated, gossamer-like construction but when a plurality of layers of the material is placed in superimposed relationship, an efficient filtration medium is provided.

In the use of this filter material, it may be stretched over supporting frames of a unit-cell type, such as that shown in my co-pending application, Serial No. 211,948, filed August 10, 1927, or may be placed upon a foraminous moving, supporting surface of a continuous automatic filter such as that shown in my co-pending application, Serial No. 242,080 filed December 23, 1927 now Patent No. 1,783,181 issued December 2, 1930.

In either instance, after the filter material has become filled with dirt and dust to such a point that it presents an objectionable resistance to the flow or passage of air therethrough, the material is removed and discarded, and new filter material is put on in its place.

Although but one specific embodiment of this invention has been herein shown and described, it will be understood that details of the construction shown may be altered or omitted without departing from the spirit of this invention as defined by the following claims.

I claim:

1. A filtering medium for air and gas comprising a plurality of assembled sheets of pervious paper having a loose fibrous texture, said assembled sheets having spaced compressed portions wherein said sheets are united and uncompressed loose portions between said compressed portions wherein the sheets are in separable relatively movable relation to permit passage of air or gas through and between them, said compressed and uncompressed portions being so related that the assembled sheets present in effect a flexible non-resilient unitary filtering mat.

2. An air and gas filtration medium comprising a plurality of super-imposed separate layers of sheet-like fibrous material, each sheet being of transparent veil-like character.

3. An air and gas filtration medium comprising a plurality of super-imposed craped layers of sheet-like fibrous material, wherein each sheet is so thin and so formed with openings as to be of transparent veil-like character.

4. An air and gas filtration medium comprising a plurality of super-imposed separate layers of sheet-like fibrous material, wherein each sheet consists of a thin net work of delicate threads and is of a limp flimsy character.

5. An air and gas filtration medium comprising a plurality of super-imposed craped layers of sheet-like fibrous material, wherein each sheet consists of a thin, flimsy, open network of matted fibres.

6. An air and gas filtration medium comprising a plurality of super-imposed layers of transparent veil-like sheets, loosely contacting with one another.

7. An air and gas filtration medium comprising a plurality of super-imposed craped layers of flimsy sheets jointed at spaced intervals to form fluffy pads between the points of joining, each sheet consisting of a net work of threads which is so thin and so open as to give the sheet a transparent veil-like character.

Signed at Chicago this 22d day of November 1927.

HANS E. BIRKHOLZ.